though in the liver, can be orally administered. Further, in marked contrast with related compounds containing a catechol nucleus such as, for example, epinephrine, or the like, the therapeutic materials of the present invention are characterized by a high degree of stability and remain substantially unaffected on exposure to oxygen. In addition, some of the novel β-hydroxy - β - dihydroxy - phenyl-alkyl-pyrrolidines exhibit very low pressor activity; for example, N-[β-hydroxy-β-(3,4 - dihydroxyphenyl)-ethyl]-pyrrolidine hydrochloride exerts only 1/260 of the pressor effect produced by epinephrine.

United States Patent Office 2,864,825
Patented Dec. 16, 1958

2,864,825

PYRROLIDINES

Richard V. Heinzelman, Kalamazoo Township, Kalamazoo County, and Brooke D. Aspergren, Kalamazoo, Mich., assignors to The Upjohn Company, Kalamazoo, Mich., a corporation of Michigan No Drawing. Application November 12, 1952
Serial No. 320,124

10 Claims. (Cl. 260—326.5)

This invention relates to new compositions of matter which possess therapeutic value. More particularly, the invention relates to β-hydroxy-β-dihydroxyphenyl-alkyl-pyrrolidines, acid addition and quaternary ammonium salts thereof, and to a method for the preparation of these compounds.

The novel β-hydroxy-β-dihydroxyphenyl-alkyl-pyrrolidines are represented by the following general formula:

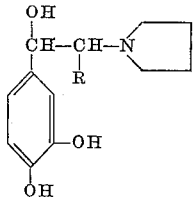

wherein R is hydrogen or a lower-alkyl group containing from one to eight carbon atoms inclusive.

It is an object of the present invention to provide novel β-hydroxy-β-dihydroxyphenyl-alkyl-pyrrolidines possessing valuable therapeutic properties. Another object of this invention is to provide a process for the preparation of these compounds. Other objects and features of the invention will be apparent to those skilled in the art to which this invention pertains.

The foregoing and additional objects are accomplished by the provision of compounds having the formula given above.

These novel compounds are useful for therapeutic purposes, for example, as bronchodilators, and, since they are not deaminated in the liver, can be orally administered. Further, in marked contrast with related compounds containing a catechol nucleus such as, for example, epinephrine, or the like, the therapeutic materials of the present invention are characterized by a high degree of stability and remain substantially unaffected on exposure to oxygen. In addition, some of the novel β-hydroxy - β - dihydroxy - phenyl-alkyl-pyrrolidines exhibit very low pressor activity; for example, N-[β-hydroxy-β-(3,4 - dihydroxyphenyl)-ethyl]-pyrrolidine hydrochloride exerts only 1/260 of the pressor effect produced by epinephrine.

The compounds of the present invention may be prepared by dissolving a β-keto-β-dihydroxyphenyl-alkyl-pyrrolidine or β-keto-β-dibenzyloxyphenyl-alkyl-pyrrolidine, preferably in the form of an acid addition salt such as, for example, β-keto-β-dihydroxyphenyl-alkyl-pyrrolidine hydrochloride, or the like, in a solvent such as water, ethanol, or the like, and subjecting the resulting solution to hydrogenation with hydrogen, preferably at superatmospheric pressure, i. e., about thirty to eighty pounds pressure per square inch, in the presence of a hydrogenation catalyst such as palladium-charcoal, platinum, platinum oxide, or the like, the temperature during the hydrogenation step being maintained between about twenty and seventy degrees centigrade. The hydrogenation of the β-keto-β-dihydroxyphenyl-alkyl-pyrrolidine or β-keto-β-dibenzyloxyphenyl-alkyl-pyrrolidine to the desired β-hydroxy-β-dihydroxyphenyl-alkyl-pyrrolidine is effected within a period of about one to about ten hours, depending upon reaction conditions such as the temperature and pressure employed. After filtering the reaction mixture to remove the hydrogenation catalyst, the solvent is removed by distillation at sub-atmospheric pressure. The residue thus-obtained may be dissolved in a solvent such as ethanol or the like, decolorized with activated carbon and cooled to obtain a β-hydroxy-β-dihydroxyphenyl-alkyl-pyrrolidine. Where the starting material for the preparation of a β-hydroxy-β-dihydroxyphenyl-alkyl-pyrrolidine is an acid addition salt of a β-keto-dihydroxyphenyl-alkyl-pyrrolidine or β-keto-β-dibenzyloxyphenyl-alkyl-pyrrolidine such as, for example, β-keto-β-dihydroxyphenyl-alkyl-pyrrolidine hydrochloride or β-keto-β-dibenzyloxyphenyl-alkyl-pyrrolidine benzoate, or the like, the corresponding acid addition salt of β-hydroxy-β-dihydroxyphenyl-alkyl-pyrrolidine is obtained such as, for example, β-hydroxy-β-dihydroxyphenyl-alkyl-pyrrolidine hydrochloride, β-hydroxy-β-dihydroxyphenyl-alkyl-pyrrolidine benzoate, or the like. To convert a β-hydroxy-β-dihydroxyphenyl-alkyl-pyrrolidine acid addition salt to the free amine base, an aqueous solution of the β-hydroxy-β-dihydroxyphenyl-alkyl-pyrrolidine acid addition salt may be neutralized by the addition of an alkali such as ammonium carbonate, ammonium hydroxide, sodium bicarbonate, sodium hydroxide, potassium bicarbonate, and preferably ammonium hydroxide or ammonium carbonate, followed by extraction of the resulting solution with a water-immiscible organic solvent to obtain the desired β-hydroxy-β-dihydroxyphenyl-alkyl-pyrrolidine.

The β-hydroxy-β-dihydroxyphenyl-alkyl-pyrrolidines of the present invention are generally low-melting solids or oils which are readily soluble in common organic solvents such as ether, ethyl acetate, benzene, or the like; soluble in oils such as peanut oil, cottonseed oil, soybean oil, or the like; and insoluble in water.

Due to the presence of nitrogen in the molecule, the β-hydroxy-β-dihydroxyphenyl-alkyl-pyrrolidines react with suitable acids to form acid addition salts. Representative acids which may be used include mineral acids such as hydrogen chloride, hydrogen bromide, sulfuric acid, or the like; aliphatic carboxylic acids such as acetic acid, lactic acid, tartaric acid, succinic acid, or the like; aromatic acids such as benzoic said, or the like; and strongly acidic phenols such as picric acid, or the like.

Various procedures can be used to prepare the acid addition salts of the β-hydroxy-β-dihydroxyphenyl-alkyl pyrrolidines of the present invention. In a preferred method, a β-hydroxy-β-dihydroxyphenyl-alkyl-pyrrolidine is dissolved in an organic solvent in which the resulting acid addition salt is insoluble and then mixed in stoichiometric proportions with a selected acid, whereupon the resulting insoluble β-hydroxy-β-dihydroxyphenyl-alkyl-pyrrolidine acid addition salt usually precipitates from the solution. Another method for the preparation of acid addition salts of β-hydroxy-β-dihydroxyphenyl-alkyl-pyrrolidines consists in admixing a solution of a β-hydroxy-β-dihydroxyphenyl-alkyl-pyrrolidine in a solvent such as ethyl acetate or the like, with an alcoholic solution of a selected acid and then evaporating the resulting solution to dryness to obtain the desired acid addition salt of the β - hydroxy - β-dihydroxyphenyl-alkyl-pyrrolidine. Other methods for preparing acid addition salts of amines may also be used and are known in the art.

Quaternary ammonium salts of the β-hydroxy-β-dihydroxyphenyl-alkyl-pyrrolidines of the present invention may be prepared in any convenient manner known in the art, as by mixing the free amine base with a selected ester in stoichiometric proportions, either in the presence of an organic solvent in which the resulting quaternary ammonium salt is insoluble so that precipitation occurs upon formation thereof, or by admixing solutions of the selected ester and β-hydroxy-β-dihydroxyphenyl-alkyl-pyrrolidine and evaporating to dryness to yield the solid quarternary ammonium salt. Representative esters which may be used to form quaternary ammonium salts of β-hydroxy-β-dihydroxyphenyl-alkyl-pyrrolidines are alkyl halides, aralkyl halides, and alkyl esters of arylsulfonic acids, such as, for example, methyl bromide, methyl iodide, cetyl bromide, myristyl iodide, lauryl bromide, benzyl chloride, allyl bromide, ethyl-(para-toluene)-sulfonate, or the like, in which cases the β-hydroxy-β-dihydroxyphenyl-alkyl-pyrrolidine and the selected salt-forming agent are merely mixed together, heated to complete the reaction, and the resulting quaternary ammonium salt of the β-hydroxy-β-dihydroxyphenyl-alkyl-pyrrolidine thereafter isolated.

The acid addition and quaternary ammonium salts of the β-hydroxy-β-dihydroxyphenyl-alkyl-pyrrolidines are usually crystalline compounds possessing well-defined melting points and are generally soluble in water and the lower-aliphatic alcohols and substantially insoluble in solvents such as diethyl ether, benzene, carbon tetrachloride, or the like.

β-Keto-β-dihydroxyphenyl-alkyl-pyrrolidines or β-keto-β-dibenzyloxyphenyl-alkyl-pyrrolidines used as starting materials in the preparation of the β-hydroxy-β-dihydroxyphenyl-alkyl-pyrrolidines of the present invention are obtained by reacting pyrrolidine with a solution of an alpha-halo-dihydroxyacetophenone or alpha-halo-dibenzyloxyacetophenone such as, for example, α-chloro-3,4-dihydroxyacetophenone, α-bromo-3,4-dihydroxyacetophenone, α-chloro-3,4-dihydroxypropiophenone, α-bromo-3,4-dibenzyloxypropiophenone, or the like. An alcoholic solution of a desired acid such as, for example, hydrogen chloride, sulfuric acid, or the like, is then added to the reaction mixture to obtain the corresponding β-keto-β-dihydroxyphenyl-alkyl-pyrrolidine or β-keto-β-dibenzyloxyphenyl-alkyl-pyrrolidine acid addition salt.

The following preparations and examples are illustrative of the processes and products of this invention and are not to be construed as limiting.

PREPARATION 1

*N-[β-keto-β-(3,4-dihydroxyphenyl)-ethyl]-pyrrolidine hydrochloride*

A mixture of 28.4 grams of pyrrolidine and 18.6 grams of α-bromo-3,4-dihydroxyacetophenone dissolved in 100 milliliters of isopropanol was heated under reflux for one and one-half hours. The reaction mixture was externally cooled, mixed with twenty milliliters of an isopropanol solution of hydrogen chloride and diluted with 100 milliliters of ether. A reddish-brown material, identified as N-[β-keto-β-(3,4-dihydroxyphenyl)-ethyl]-pyrrolidine hydrochloride, precipitated from the solution and was separated by filtration. On successive recrystallizations of the crude N-[β-keto-β-(3,4-dihydroxyphenyl)-ethyl]-pyrrolidine hydrochloride from 200 milliliters of absolute ethanol, and a mixture of 200 milliliters of denatured alcohol and sixty milliliters of water, a sixteen gram yield of substantially pure N-[β-keto-β-(3,4-dihydroxyphenyl)-ethyl]-pyrrolidine hydrochloride, melting at 244 degrees centrigrade with decomposition, was obtained.

*Analysis.*—Calc. for $C_{12}H_{16}ClNO_3$: C, 55.92; H, 6.26; N, 5.44. Found: C, 55.95; H, 6.16; N, 5.60.

By neutralizing an aqueous solution of N-[β-keto-β-(3,4-dihydroxphenyl)-ethyl]-pyrrolidine hydrochloride with ammonium hydroxide, N-[β-keto-β-(3,4-dihydroxyphenyl)-ethyl]-pyrrolidine is obtained.

In addition to N-[β-keto-β-(3,4-dihydroxyphenyl)-ethyl]-pyrrolidine hydrochloride prepared above, other acid addition salts of N-[β-keto-β-(3,4-dihydroxyphenyl)-ethyl]-pyrrolidine may be similarly obtained by reaction thereof with selected acids such as sulfuric acid, benzoic acid, and the like, to obtain the corresponding N-[β-keto-β-(3,4-dihydroxyphenyl)-ethyl]-pyrrolidine sulfate, N-[β-keto-β-(3,4-dihydroxyhenpyl)-ethyl]-pyrrolidine benzoate, and the like.

PREPARATION 2

*N-[β-keto-β-(3,4-dibenzyloxyphenyl)-ethyl]-pyrrolidine hydrochloride*

Following the procedure set forth in Preparation 1 supra except for the substitution of α-bromo-3,4-dihydroxyacetophenone by α-bromo-3,4-dibenzyloxyacetophenone, N-[β-keto-β-(3,4-dibenzyloxyphenyl)-ethyl]-pyrrolidine hydrochloride is obtained.

By neutralizing an aqueous solution of N-[β-keto-β-(3,4-dibenzyloxyphenyl)-ethyl]-pyrrolidine hydrochloride with sodium bicarbonate, N-[β-keto-β-(3,4-dibenzyloxyphenyl)-ethyl]-pyrrolidine is obtained.

PREPARATION 3

*N-[α-methyl-β-keto-β-(3,4-dibenzyloxyphenyl)-ethyl]-pyrrolidine hydrochloride*

Twenty grams of pyrrolidine was added at a uniform rate and over a period of about thirty minutes to a well-agitated solution of thirty grams of α-bromo-3,4-dibenzyloxypropiophenone dissolved in 150 milliliters of anhydrous benzene. The resulting mixture was stirred at room temperature for about twelve hours, washed with an equal volume of water and the benzene removed from the mixture by distillation at sub-atomspheric pressure. The residue was dissolved in 100 milliliters of ethyl acetate and, when mixed with a cooled solution of fifteen milliliters of an ethanol solution of hydrogen chloride, a crystalline precipitate, identified as N-[α-methyl-β-keto-β-(3,4-dibenzyloxyphenyl)-ethyl]-pyrrolidine hydrochloride, was obtained. On recrystallization of the crude N-[α-methyl-β-keto-β-(3,4-dibenzyloxyphenyl)-ethyl]-pyrrolidine hydrochloride from 300 milliliters of denatured alcohol, a 23 gram yield of the substantially pure N-[α-methyl-β-keto-β-(3,4-dibenzyloxyphenyl)-ethyl]-pyrrolidine hydrochloride, melting at 210 to 212 degrees centigrade, was obtained.

*Analysis.*—Calc. for $C_{27}H_{30}ClNO_3$: C, 71.43; H, 7.11; Cl, 7.81; N, 3.09. Found: C, 71.48; H, 6.71; Cl, 7.89; N, 3.19.

By neutralizing an aqueous solution of N-[α-methyl-β-keto-β-(3,4-dibenzyloxyphenyl)-ethyl]-pyrrolidine hydrochloride with ammonium hydroxide, N-[α-methyl-β-keto-β-(3,4-dibenzyloxyphenyl)-ethyl]-pyrrolidine is obtained.

PREPARATION 4

*N-[α-ethyl-β-keto-β-(3,4-dibenzyloxyphenyl)-ethyl]-pyrrolidine hydrochloride*

Following the procedure set forth in Preparation 3 supra except for the substitution of α-bromo-3,4-dibenzyloxypropiophenone by α-bromo-3,4-dibenzyloxybutyrophenone, N-[α-ethyl-β-keto-β-(3,4-dibenzyloxyphenyl)-ethyl]-pyrrolidine hydrochloride is obtained.

By neutralizing an aqueous solution of N-[α-ethyl-β-keto-β-(3,4-dibenzyloxyphenyl)-ethyl]-pyrrolidine hydrochloride with potassium bicarbonate, N-[α-ethyl-β-keto-β-(3,4-dibenzyloxyphenyl)-ethyl]-pyrrolidine is obtained.

Following the procedure set forth above, other β-keto-β-(3,4-dihydroxyphenyl)-alkyl-pyrrolidines, β-keto-β-(3,4-dibenzyl-oxyphenyl)-alkyl-pyrrolidines and acid addition salts thereof may be similarly prepared such as, for example, N-[α-methyl-β-keto-β-(3,4-dihydroxyphenyl)-ethyl]-pyrrolidine sulfate, N-[α-ethyl-β-keto-β-(3,4-dihydroxyphenyl)-ethyl]-pyrrolidine, N-[α-ethyl-β-keto-β-(3,4-dihydroxyphenyl)-ethyl]-pyrrolidine hydrochloride, N-[α-propyl-β-keto-β-(3,4-dibenzyloxyphenyl)-ethyl]-pyrrolidine, N - [α - propyl - β - keto - β - (3,4 - dibenzyloxyphenyl) - ethyl] - pyrrolidine hydrochloride, N - [α-propyl - β - keto - β - (3,4 - dihydroxyphenyl) - ethyl]-pyrrolidine, N - [α - propyl - β - keto - β - (3,4 - dihydroxyphenyl) - ethyl] - pyrrolidine hydrochloride, N - [α-butyl - β - keto - β - (3,4 - dibenzyloxyphenyl) - ethyl]-pyrrolidine, N - [α - butyl - β - keto - β - (3,4 - dibenzyloxyphenyl) - ethyl] - pyrrolidine hydrochloride, and the like.

EXAMPLE 1

N - [β - hydroxy - β - (3,4 - dihydroxyphenyl)-ethyl]-pyrrolidine

Twenty-one grams of N-[β-keto-β-(3,4-dihydroxyphenyl)-ethyl]-pyrrolidine hydrochloride, obtained as in Preparation 1 supra, was dissolved in fifty milliliters of water, one gram of ten percent palladium-charcoal catalyst added thereto and the resulting mixture hydrogenated under a hydrogen pressure of about fifty pounds per square inch at a temperature of about fifty degrees centigrade until about one mole of hydrogen per mole of starting N-[β-keto-β-(3,4-dihydroxyphenyl)-ethyl]-pyrrolidine hydrochloride was taken up, i. e., about twelve hours. The catalyst was separated from the reaction mixture by filtration and the solvent removed by distillation at sub-atmospheric pressure. The crystalline residue thus-obtained was dissolved in hot absolute ethanol, decolorized with activated carbon and cooled to obtain substantially pure N-[β-hydroxy-β-(3,4-dihydroxyphenyl)-ethyl]-pyrrolidine hydrochloride melting at 168 to 169 degrees centigrade. N-[β-hydroxy-β-(3,4-dihydroxyphenyl)-ethyl]-pyrrolidine hydrochloride, a white to pale purple crystalline solid, is soluble in water, fairly soluble in alcohol and relatively insoluble in ether, ethyl acetate and benzene.

Analysis.—Calc. for $C_{13}H_{20}ClNO_3$: C, 55.49; H, 6.98; Cl, 13.65; N, 5.39. Found: C, 55.63; H, 6.72; Cl, 13.60; N, 5.55.

To convert N-[β-hydroxy-β-(3,4-dihydroxyphenyl)-ethyl]-pyrrolidine hydrochloride to the free amine base, five grams of the thus-obtained N-[β-hydroxy-β-(3,4-dihydroxyphenyl)-ethyl]-pyrrolidine hydrochloride was dissolved in 25 milliliters of water and the solution neutralized by the addition thereto of ammonium hydroxide followed by extraction of the resulting neutral solution with fifty milliliters of chloroform to obtain the desired N - [β - hydroxy - β - (3,4 - dihydroxyphenyl) - ethyl]-pyrrolidine.

By heating a solution of N-[β-hydroxy-β-(3,4-dihydroxyphenyl)-ethyl]-pyrrolidine with methyl iodide in benzene and cooling and concentrating the solution, the corresponding N - [β - hydroxy - β - (3,4 - dihydroxyphenyl) - ethyl] - pyrrolidine methiodide is obtained.

Similarly by reacting N-[β-hydroxy-β-(3,4-dihydroxyphenyl)-ethyl]-pyrrolidine with selected esters such as, for example, methyl bromide, ethyl chloride, benzyl chloride, and the like, the corresponding quaternary ammonium salts of N-[β-hydroxy-β-(3,4-dihydroxyphenyl)-ethyl]-pyrrolidine are obtained such as, for example, N - [β - hydroxy - β - (3,4 - dihydroxyphenyl) - ethyl]-pyrrolidine methobromide, N-[β-hydroxy-β-(3,4-dihydroxyphenyl)-ethyl]-pyrrolidine ethochloride, N-[β-hydroxy - β - (3,4 - dihydroxyphenyl) - ethyl] - pyrrolidine benzyl chloride, and the like.

EXAMPLE 2

N-[β-hydroxy-β-(3,4-dihydroxyphenyl)-ethyl]-pyrrolidine

Twenty grams of N-[β-keto-β-(3,4-dibenzyloxyphenyl)-ethyl]-pyrrolidine hydrochloride, obtained as in Preparation 2 supra, was dissolved in 75 milliliters of ethanol, two grams of ten percent palladium-charcoal catalyst added thereto, and the resulting mixture hydrogenated at a hydrogen pressure of about fifty pounds per square inch at about fifty degrees centigrade until about three moles of hydrogen per mole of starting N-[β-keto-β-(3,4-dibenzyloxyphenyl)-ethyl]-pyrrolidine hydrochloride was taken up, i. e., about 24 hours. The catalyst was separated from the reaction mixture by filtration and the solvent removed by distillation at sub-atmospheric pressure. The residue thus-obtained was recrystallized from a mixture of ethanol and ethyl ether to obtain substantially pure N-[β-hydroxy-β-(3,4-dihydroxyphenyl)-ethyl]-pyrrolidine hydrochloride.

By treating the thus-obtained N-[β-hydroxy-β-(3,4-dihydroxyphenyl)-ethyl]-pyrrolidine hydrochloride with ammonium hydroxide in the manner set forth in Example 1 supra, N-[β-hydroxy-β-(3,4-dihydroxyphenyl)-ethyl]-pyrrolidine is obtained.

EXAMPLE 3

N-[α-methyl-β-hydroxy-β-(3,4-dihydroxyphenyl)-ethyl]-pyrrolidine

Twenty-three grams of N-[α-methyl-β-keto-β-(3,4-dibenzyloxyphenyl)-ethyl]-pyrrolidine hydrochloride, obtained as in Preparation 3 supra, was dissolved in 75 milliliters of ethanol, two grams of ten percent palladium-charcoal catalyst added thereto, and the resulting mixture hydrogenated at a hydrogen pressure of about fifty pounds per square inch at about fifty degrees centigrade until about three moles of hydrogen per mole of starting N - [α - methyl - β - keto - β - (3,4 - dibenzyloxyphenyl)-ethyl]-pyrrolidine hydrochloride was taken up, i. e., about 24 hours. The catalyst was separated from the reaction mixture by filtration and the solvent removed by distillation at sub-atmospheric pressure. The solid residue thus-obtained was recrystallized from a mixture of ethanol and ethyl ether to obtain substantially pure N - [α - methyl - β - hydroxy - β - (3,4 - dihydroxyphenyl)-ethyl]-pyrrolidine hydrochloride, melting at 189 to 190 degrees centigrade.

Analysis.—Calc. for $C_{13}H_{20}ClNO_3$: C, 57.03; H, 7.33; Cl, 12.95; N, 5.12. Found: C, 56.92; H, 7.36; Cl, 12.94; N, 4.99.

By treating the thus-obtained N-[α-methyl-β-hydroxy-β-(3,4-dihydroxyphenyl)-ethyl]-pyrrolidine hydrochloride with an alkali such as, for example, ammonium hydroxide, in the manner set forth in Example 1 supra, N-[α-methyl-β-hydroxy-β-(3,4-dihydroxyphenyl) - ethyl] - pyrrolidine is obtained.

By heating a solution of N-[α-methyl-β-hydroxy-β-(3,4-dihydroxyphenyl)-ethyl]-pyrrolidine with ethyl chloride in ether and cooling and concentrating the solution, the corresponding N-[α-methyl-β-hydroxy-β-(3,4-dihydroxyphenyl)-ethyl]-pyrrolidine ethochloride is obtained.

Similarly, by reacting N-[α-methyl-β-hydroxy-β-(3,4-dihydroxyphenyl)-ethyl]-pyrrolidine with selected esters such as, for example, methyl chloride, methyl iodide, benzyl chloride, and the like, the corresponding quaternary ammonium salts of N-[α-methyl-β-hydroxy-β-(3,4-dihydroxyphenyl)-ethyl]-pyrrolidine are obtained such as, for example, N-[-α-methyl-β-hydroxy-β-(3,4-dihydroxyphenyl)-ethyl]-pyrrolidine methochloride, N-[α-methyl-β-hydroxy-β-(3,4-dihydroxyphenyl) - ethyl] - pyrrolidine methiodide, N-[α-methyl-β-hydroxy - β - (3,4-dihydroxyphenyl)-ethyl]-pyrrolidine benzyl chloride, and the like.

EXAMPLE 4

N-[α-ethyl-β-hydroxy-β-(3,4-dihydroxyphenyl)-ethyl]-pyrrolidine

Following the procedure set forth in Example 3 supra except for the substitution of N-[α-methyl-β-keto-β-(3,4-dibenzyloxyphenyl)-ethyl]-pyrrolidine hydrochloride by N-[α-ethyl-β-keto - β - (3,4-dibenzyloxyphenyl) - ethyl]-pyrrolidine hydrochloride, obtained as in Preparation 4 supra, N - [α-ethyl-β-hydroxy-β-(3,4-dihydroxyphenyl)-ethyl]-pyrrolidine hydrochloride is obtained.

By treating the thus-obtained N-[α-ethyl-β-hydroxy-β-(3,4-dihydroxyphenyl)-ethyl]-pyrrolidine hydrochloride with ammonium hydroxide in the manner set forth in Example 1 supra, N-[α-ethyl-β-hydroxy-β-(3,4-dihydroxyphenyl)-ethyl]-pyrrolidine is obtained.

Similarly, other β-hydroxy-β-dihydroxyphenyl-ethyl-pyrrolidines can be prepared such as, for example, N-[β-hydroxy-β-(3,4-dihydroxyphenyl)-ethyl]-pyrrolidine sulfate, N-[β-hydroxy-β-(3,4-dihydroxyphenyl)-ethyl]-pyrrolidine benzoate, N-[α-methyl-β-hydroxy-β-(3,4-dihydroxyphenyl)-ethyl]-pyrrolidine sulfate, N-[α-methyl-β-hydroxy-β-(3,4-dihydroxyphenyl)-ethyl]-pyrrolidine benzoate, N-[α-propyl-β-hydroxy-β-(3,4-dihydroxyphenyl)-ethyl]-pyrrolidine, N-[α-propyl-β-hydroxy-β-(3,-4-dihydroxyphenyl)-ethyl]-pyrrolidine hydrochloride, N-[α-butyl-β-hydroxy-β-(3,4-dihydroxyphenyl)-ethyl]-pyrrolidine, N-[α-pentyl-β-hydroxy-β-(3,4-dihydroxyphenyl)-ethyl]-pyrrolidine, N-[α-hexyl-β-hydroxy-β-(3,4-dihydroxyphenyl)-ethyl]-pyrrolidine, N-[α-heptyl-β-hydroxy-β-(3,4-dihydroxyphenyl)-ethyl]-pyrrolidine, N-[α-octyl-β-hydroxy-β-(3,4-dihydroxyphenyl)-ethyl]-pyrrolidine, acid addition and quaternary ammonium salts of the foregoing amine bases, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A member selected from the group consisting of (a) compounds of the formula:

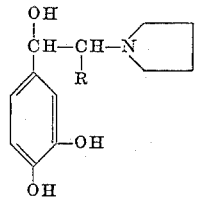

wherein R is a member selected from the group consisting of hydrogen and lower-alkyl radicals containing from one to eight carbon atoms inclusive, and (b) acid addition and quaternary ammonium salts thereof.

2. N-[β-hydroxy-β-(3,4-dihydroxyphenyl)-ethyl] - pyrrolidine.

3. Acid addition salts of N-[β-hydroxy-β-(3,4-dihydroxyphenyl)-ethyl]-pyrrolidine.

4. N - [β - hydroxy-β-(3,4-dihydroxyphenyl) - ethyl]-pyrrolidine hydrochloride.

5. N - [α-lower-alkyl-β-hydroxy-β-(3,4-dihydroxyphenyl)-ethyl]-pyrrolidine.

6. Acid addition salts of N-[α-lower-alkyl-β-hydroxy-β-(3,4-dihydroxyphenyl)-ethyl]-pyrrolidine.

7. N-[α-methyl-β-hydroxy - β - (3,4-dihydroxyphenyl)-ethyl]-pyrrolidine.

8. Acid addition salts of N-[α-methyl-β-hydroxy-β-(3,4-dihydroxyphenyl)-ethyl]-pyrrolidine.

9. N - [α - methyl - β - hydroxy - β - (3,4 - dihydroxyphenyl)-ethyl]-pyrrolidine hydrochloride.

10. N - [α - ethyl - β - hydroxy - β - (3,4-dihydroxyphenyl)-ethyl]-pyrolidine.

References Cited in the file of this patent
UNITED STATES PATENTS

| | | |
|---|---|---|
| 1,978,539 | Klarer et al. | Oct. 30, 1934 |
| 2,552,502 | Woodruff | May 8, 1951 |
| 2,649,444 | Barrett | Aug. 18, 1953 |
| 2,662,886 | Ruddy et al. | Dec. 15, 1953 |
| 2,682,543 | Adamson et al. | June 29, 1954 |
| 2,683,742 | Cusic | July 13, 1954 |
| 2,686,808 | Sprague | Aug. 17, 1954 |
| 2,707,187 | Koehneke | Apr. 26, 1955 |
| 2,716,121 | Denton | Aug. 23, 1955 |

FOREIGN PATENTS

| | | |
|---|---|---|
| 884,569 | France | Aug. 20, 1949 |
| 1,091,778 | France | Nov. 3, 1954 |
| 805,521 | Germany | Mar. 15, 1951 |
| 624,118 | Great Britain | May 27, 1949 |
| 627,139 | Great Britain | July 29, 1949 |